US009932235B2

(12) United States Patent
Lee et al.

(10) Patent No.: US 9,932,235 B2
(45) Date of Patent: Apr. 3, 2018

(54) PREPARATION METHOD OF BATTERY COMPOSITE MATERIAL AND PRECURSOR THEREOF

(71) Applicant: Advanced Lithium Electrochemistry Co., Ltd., Taoyuan, Taoyuan County (TW)

(72) Inventors: Wen-Chao Lee, Taoyuan (TW); Hsiang-Pin Lin, Taoyuan (TW); Han-Wei Hsieh, Taoyuan (TW)

(73) Assignee: Advanced Lithium Electrochemistry Co., Ltd., Taoyuan (TW)

( * ) Notice: Subject to any disclaimer, the term of this patent is extended or adjusted under 35 U.S.C. 154(b) by 256 days.

(21) Appl. No.: 14/424,517

(22) PCT Filed: Aug. 28, 2013

(86) PCT No.: PCT/CN2013/082451
§ 371 (c)(1),
(2) Date: Feb. 27, 2015

(87) PCT Pub. No.: WO2014/032588
PCT Pub. Date: Mar. 6, 2014

(65) Prior Publication Data
US 2015/0218000 A1 Aug. 6, 2015

Related U.S. Application Data

(60) Provisional application No. 61/694,034, filed on Aug. 28, 2012.

(51) Int. Cl.
*C01B 25/45* (2006.01)
*H01B 1/08* (2006.01)
(Continued)

(52) U.S. Cl.
CPC .............. *C01B 25/45* (2013.01); *C01B 25/42* (2013.01); *C01G 45/00* (2013.01); *H01B 1/08* (2013.01);
(Continued)

(58) Field of Classification Search
CPC .. H01B 1/00; H01B 1/06; H01M 4/58; H01M 4/5825; C01G 45/00
See application file for complete search history.

(56) References Cited

U.S. PATENT DOCUMENTS

2011/0052988 A1* 3/2011 Beck ................... H01M 4/5825
429/221

FOREIGN PATENT DOCUMENTS

| CN | 1375480 A | 10/2002 |
|---|---|---|
| CN | 101673820 A | 3/2010 |

(Continued)

OTHER PUBLICATIONS

Daiwon Choi et al., "LiMnPO4 Nanoplate Grown via Solid-State Reaction in Molten Hydrocarbon for Li-Ion Battery Cathode," Nano Letters, 2010, pp. 2799-2805, vol. 10, American Chemical Society, United States of America.

(Continued)

*Primary Examiner* — Mark Kopec
(74) *Attorney, Agent, or Firm* — Kirton McConkie; Evan R. Witt

(57) ABSTRACT

A preparation method of a battery composite material includes steps of providing phosphoric acid, manganese carbonate, water and a first reactant; processing a reaction of the phosphoric acid, the manganese carbonate and the water to produce a first product; calcining the first product to produce a precursor, which is written by $Mn_2P_2O_7$; processing a reaction of the precursor and at least the first reactant to get a reaction mixture, and then calcining the reaction mixture to produce the battery composite material. As a result, the present invention achieves the advantages of reducing the times of the reduction-oxidation reaction, so that the stability of the processes is enhanced, and the difficulty of the processes is reduced.

12 Claims, 17 Drawing Sheets

(51) Int. Cl.
*H01M 4/58* (2010.01)
*C01B 25/42* (2006.01)
*C01G 45/00* (2006.01)

(52) U.S. Cl.
CPC ....... *H01M 4/5825* (2013.01); *C01P 2002/22* (2013.01); *C01P 2004/04* (2013.01); *C01P 2006/42* (2013.01)

(56) References Cited

FOREIGN PATENT DOCUMENTS

| CN | 101913588 | | 12/2010 |
|----|-----------|---|---------|
| CN | 102205956 | A * | 10/2011 |
| CN | 102364726 | | 2/2012 |
| CN | 102610816 | A | 7/2012 |
| CN | 102640332 | A | 8/2012 |
| CN | 103022487 | | 4/2013 |
| EP | 2966713 | A1 * | 1/2016 |
| JP | 2004359538 | A | 12/2004 |
| JP | 2011213587 | A | 10/2011 |
| JP | 2012012262 | A | 1/2012 |
| JP | 2012123909 | A | 6/2012 |
| WO | 2012/039687 | | 3/2012 |
| WO | 2012/039687 | A1 | 3/2012 |
| WO | 2013010505 | A1 | 1/2013 |

OTHER PUBLICATIONS

Li Wang et al., "Synthesis of Electrochemically active LiMnPO4 via MnPO4—H2O with Different Morphology Prepared by Facile Precipitation," Int. J. Electrochem. Sci., 2012, pp. 3591-3600, vol. 7, www.electrochemsci.org, China.

* cited by examiner

PREPARATION METHOD OF BATTERY COMPOSITE MATERIAL AND PRECURSOR THEREOF

TECHNICAL FIELD

The present disclosure relates to a preparation method, and more particularly to a preparation method of a battery composite material and a precursor thereof.

BACKGROUND

Due to the sustained global energy shortage, the price of oil becomes higher and the environmental consciousness rises day by days. The most popular subject of the energy industry is how to provide a clean and effective energy. In a variety of alternative energies, the chemical battery is the most actively developing technology. With continued investment in research and development of related industries, the chemical battery technology is not only continuously improved and enhanced, but also widely used in our daily life, such as consuming electronics, medical equipment, electric bicycles, electric motorcycles, electric cars and electric buses.

Particularly, the Lithium Metal Phosphate ($LiMPO_4$, among which M may be any metal, e.g. Fe, Co, Mn) composite batteries are widely accepted by the market because of the large current and long life cycle. Also, the Lithium Metal Phosphate composite batteries have no risk of explosion and have the advantages of high power efficiency and low pollution so as to be used in replace of the conventional lead-acid, nickel-metal hydride and nickel-cadmium batteries. After years of research, the Lithium Metal Phosphate Nano-Co-crystalline Olivine (hereinafter referred as "LMP-NCO") battery is developed. The LMP-NCO battery is a single compound consisting Li, P and metals or precursor of metal composition, and is a non-coated and non-doped material, so that the LMP-NCO battery can significantly improve the power conductivity and eliminate impurities. Moreover, the price of the LMP-NCO battery is lower than conventional lithium metal phosphate materials, in which the LMP-NCO battery has higher market competitiveness and becomes the main product of the industry.

In general, ferric phosphate ($FePO_4$), lithium hydroxide (LiOH) and lithium carbonate ($Li_2CO_3$) are applied to process a reaction of the conventional preparation method of LMP-NCO. Due to the high cost of raw materials of lithium hydroxide, the high requirement of much more ferric phosphate, and much more grinding times, the costs per unit of time and money are increased. Moreover, the preparation method includes acid-base neutralization reactions, so the process is quite sensitive to the pH value, which causes the viscosity of materials and the blockage of processing pipes. Also, the processing temperature cannot be stably controlled because of the endothermic and exothermic phenomena of the neutralization reactions, such that the operation difficulty is increased over and over again.

In some manufacturing processes, manganese (Mn) is utilized in replace of iron (Fe). Nevertheless, a lack of stability of the manufacturing processes is caused by the reduction-oxidation reactions and the pH value is increased when lithium hydroxide is used in the preparation of lithium manganese phosphate, such that the performance of the products is affected by the poor carbon-coating result. In addition, in the process of the aforementioned preparation method, the materials have to be moved for several times, which causes risk of pollutions, thereby decreasing the product quality.

There is a need of providing a preparation method of a battery composite material and a precursor thereof to obviate the drawbacks encountered from the prior art.

BRIEF SUMMARY

It is an object of the present invention to provide a preparation method of a battery composite material and a precursor thereof in order to eliminate the drawbacks of the high material cost and time cost of preparing the conventional battery, the high sensitivity of pH value of the process caused by neutralization reactions, the blockage of processing pipes, the unstable temperature and the pollutions during movements of materials.

An object of the present invention provides a preparation method of a battery composite material and a precursor thereof for reducing the grinding time and the costs per unit of time and money in manner of preparing the battery composite material through the precursor produced via reactions. Meanwhile, the sensitivity of pH value of the process is reduced, the viscosity of the material and the blockage of processing pipes are avoided, the processing temperature is stably controlled, and the operation difficulty of the process is reduced.

Another object of present invention provides a preparation method of a battery composite material and a precursor thereof. By utilizing lithium carbonate in replace of lithium hydroxide, the pH value of the process becomes more stable, such that the carbon-coating result and the product performance are both enhanced.

In accordance with an aspect of the present disclosure, there is provided a preparation method of a battery composite material. The preparation method includes steps of providing phosphoric acid, manganese carbonate, water and a first reactant, processing a reaction of the phosphoric acid, the manganese carbonate and the water to produce a first product, calcining the first product to produce a precursor, among which the formula of the precursor is written by $Mn_2P_2O_7$, and processing a reaction of the precursor and at least the first reactant to obtain a reaction mixture, and then calcining the reaction mixture to produce the battery composite material.

In accordance with another aspect of the present disclosure, there is provided a preparation method of a precursor of a battery composite material. The preparation method includes steps of processing a reaction of manganese and a compound releasing phosphate ions in a solution to produce a first product, and performing a thermal treatment to the first product for producing a precursor, wherein the formula of the precursor is written by $Mn_2P_2O_7$.

In accordance with still another aspect of the present disclosure, there is provided a preparation of a battery composite material. The preparation method at least includes steps of processing a reaction of a precursor and at least a first reactant and calcining a reaction mixture of the reaction to produce the battery composite material, among which the battery composite material is lithium manganese phosphate, lithium ferric manganese phosphate, lithium manganese phosphate nano-co-crystalline olivine, or lithium ferric manganese phosphate nano-co-crystalline olivine The above contents of the present disclosure will become more readily apparent to those ordinarily skilled in the art

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
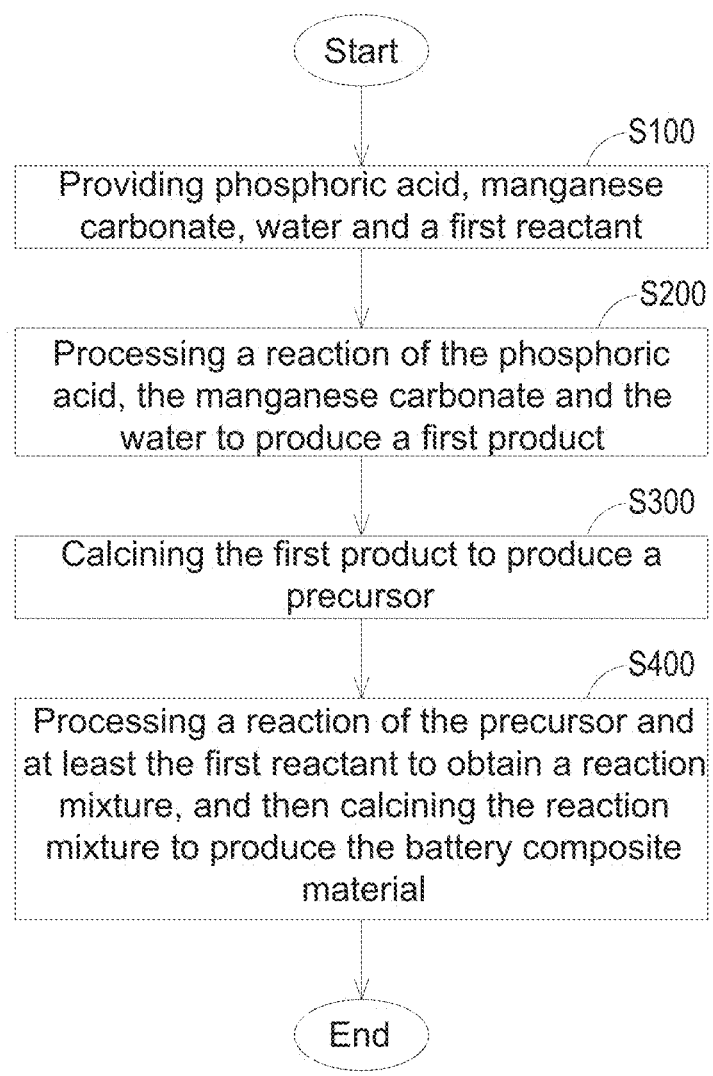
FIG. 1 schematically illustrates the flow chart of a preparation method of a battery composite material according to an embodiment of the present invention.

Please refer to FIG. 1. FIG. 1 schematically illustrates the flow chart of a preparation method of a battery composite material according to an embodiment of the present invention. A preparation method of a batter composite material of the present invention includes steps as follows. At first, providing phosphoric acid, manganese carbonate, water and a first reactant as shown in step S100, among which the formula of the phosphoric acid is written by $H_3PO_4$. In some embodiments, the first reactant is lithium carbonate ($Li_2CO_3$), a compound consisting of lithium, or a mixture of several compounds consisting of lithium, but not limited thereto.

Next, processing a reaction of the phosphoric acid, the manganese carbonate and the water to produce a first product as shown in step S200. In some embodiments, the step S200 is preferred to include a step of allowing a first quantity of the water to dissolve a second quantity of the phosphoric acid and a third quantity of the manganese carbonate and stirring for a first time period for producing the first product. The first time period is not limited to 24 hours. The weight ratio of the second quantity to the third quantity is substantially 1:1. For example, the second quantity is 462.7 grams and the third quantity is 460 grams, such that the first quantity is preferably 3.2 liters. In other words, the step S200 may include a step of allowing 3.2 liters of the water to dissolve 462.7 grams of the phosphoric acid and 460 grams of the manganese carbonate and stirring for 24 hours for producing the first product. In addition, the first product may also be obtained through a step of processing a reaction of manganese and a compound releasing phosphate ions in a solution, but not limited thereto.

Then, calcining the first product obtained in the step S200 to produce a precursor as shown in step S300, among which the formula of the precursor is written by $Mn_2P_2O_7$.

Finally, processing a reaction of the precursor and at least the first reactant to obtain a reaction mixture, and then calcining the reaction mixture to produce the battery composite material as shown in step S400, among which the battery composite material is for example $LiMnPO_4$. It should be noted that the precursor is reacted with "at least" the first reactant in the step S400. Certainly, the precursor is not limited to be reacted with the first reactant, or be reacted with the first reactant and the second reactant. For example, the first reactant is lithium carbonate and the second reactant is ferric phosphate dihydrate, among which the formula of the second reactant is written by $FePO_4 \cdot 2H_2O$. After calcining the reaction mixture, a battery composite material, which is for example lithium ferric manganese phosphate, is produced, among which the formula of lithium ferric manganese phosphate is written by $LiMn_xFe_{1-x}PO_4$ ($x>0$).

In the step S200 or the step S400, metal oxide, such as $V_2O_5$, $TiO_2$ or $MgO$, can be added into the reaction, so that a $LiMnPO_4$-like material consisting of the metal oxide, which can be called or named "lithium manganese phosphate nano-co-crystalline olivine (LMP-NCO)", or a $LiMn_xFe_{1-x}PO_4$-like material consisting of the metal oxide, which can be called or named "lithium ferric manganese phosphate nano-co-crystalline olivine (LFMP-NCO)", is produced.

Under this circumstance, the present invention provides a preparation method of a battery composite material for reducing the times of the reduction-oxidation reaction while adding lithium salts in manner of preparing the battery composite material through the reaction of lithium carbonate and the precursor produced via reactions. The stability of the processes is enhanced, and the difficulty of the processes is reduced. Meanwhile, the grinding time is significantly reduced, and further the costs per unit of time and money are reduced. The sensitivity of pH value of the process is reduced, the viscosity of the material and the blockage of processing pipes are avoided, and the processing temperature is stably controlled. Additionally, by utilizing lithium carbonate in replace of lithium hydroxide, the pH value of the process becomes more stable, such that the carbon-coating result and the product performance are both enhanced.

Figure 2:
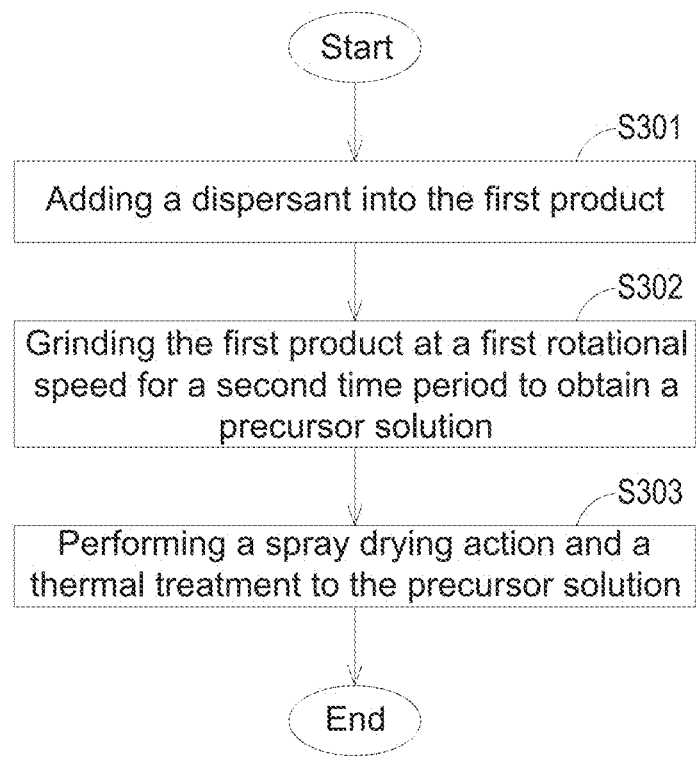
FIG. 2 schematically illustrates a detailed flow chart of the preparation method of a battery composite material according to an embodiment of the present invention.

Please refer to FIG. 1 and FIG. 2. FIG. 2 schematically illustrates a detailed flow chart of the preparation method of a battery composite material according to an embodiment of the present invention. As shown in FIG. 1 and FIG. 2, the detailed flow chart of the step S300 of the preparation method of the battery composite material of the present invention includes steps as follows. As shown in step S301, adding a dispersant into the first product. Next, grinding the first product at a first rotational speed for a second time period to obtain a precursor solution as shown in step S302. The first rotational speed is equal to or greater than 450 rpm and equal to or less than 650 rpm, and the second time period is 1 hour.

In other words, the preferred embodiment of the step S302 is a step of grinding the first product at 450-650 rpm for 1 hour to obtain the precursor solution, but not limited thereto. Then, as shown in step S303, performing a spray drying action and a thermal treatment to the precursor solution in order to obtain a dry precursor (i.e. $Mn_2P_2O_7$). In an embodiment, the thermal treatment is performed at a temperature greater than 380° C. for at least 2 hours in nitrogen atmosphere.

Figure 3:
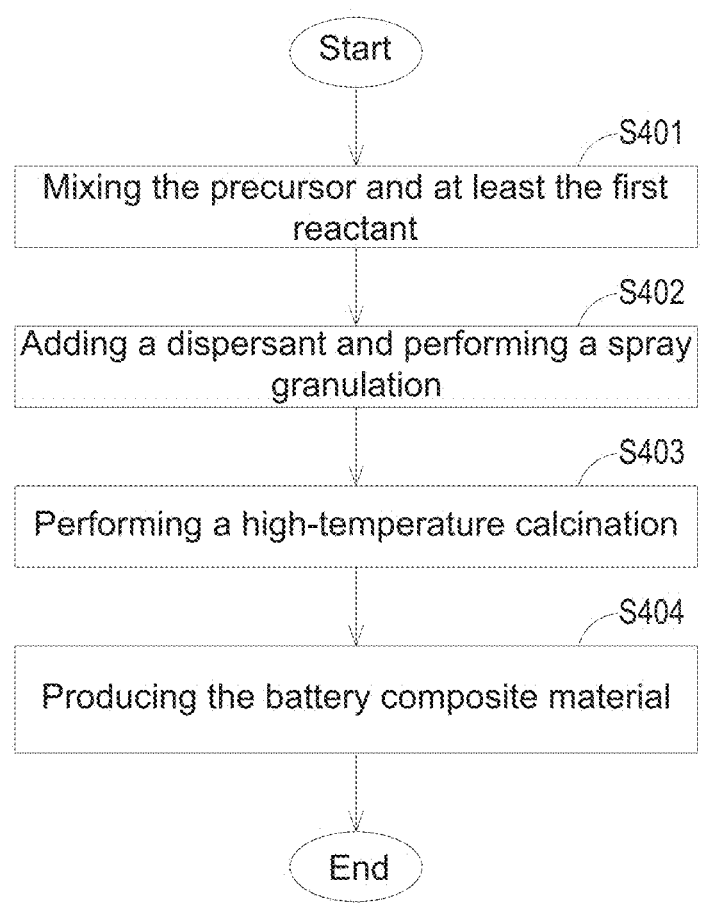
FIG. 3 schematically illustrates another detailed flow chart of the preparation method of a battery composite material according to an embodiment of the present invention.

The precursor of the preparation method of the battery composite material of the present invention is completely prepared. The detailed flow chart of the step S400 is described as follows. Please refer to FIG. 3. FIG. 3 schematically illustrates another detailed flow chart of the preparation method of a battery composite material according to an embodiment of the present invention. As shown in FIG. 3, the detailed flow chart of the step S400 includes steps of mixing the precursor (i.e. $Mn_2P_2O_7$) and the first reactant, which is not limited to be lithium carbonate ($Li_2CO_3$), a compound consisting of lithium, or a mixture of several compounds consisting of lithium as shown in step S401, adding a dispersant, which is for example polyethylene glycol tert-octylphenyl ether (i.e. TritonX-100), and performing a spray granulation as shown in step S402, performing a high-temperature calcination, which is preferably performed at a temperature between 550° C. and 750° C. for at least 8 to 12 hours in nitrogen atmosphere, as shown in step S403, and producing the battery composite material, which is for example lithium manganese phosphate, lithium ferric manganese phosphate, lithium manganese phosphate nano-co-crystalline olivine, or lithium ferric manganese phosphate nano-co-crystalline olivine, as shown in step S404.

The following embodiments are presented herein for purpose of illustration and description of the preparation method of the battery composite material of the present disclosure.

1st Embodiment

Figure 4:
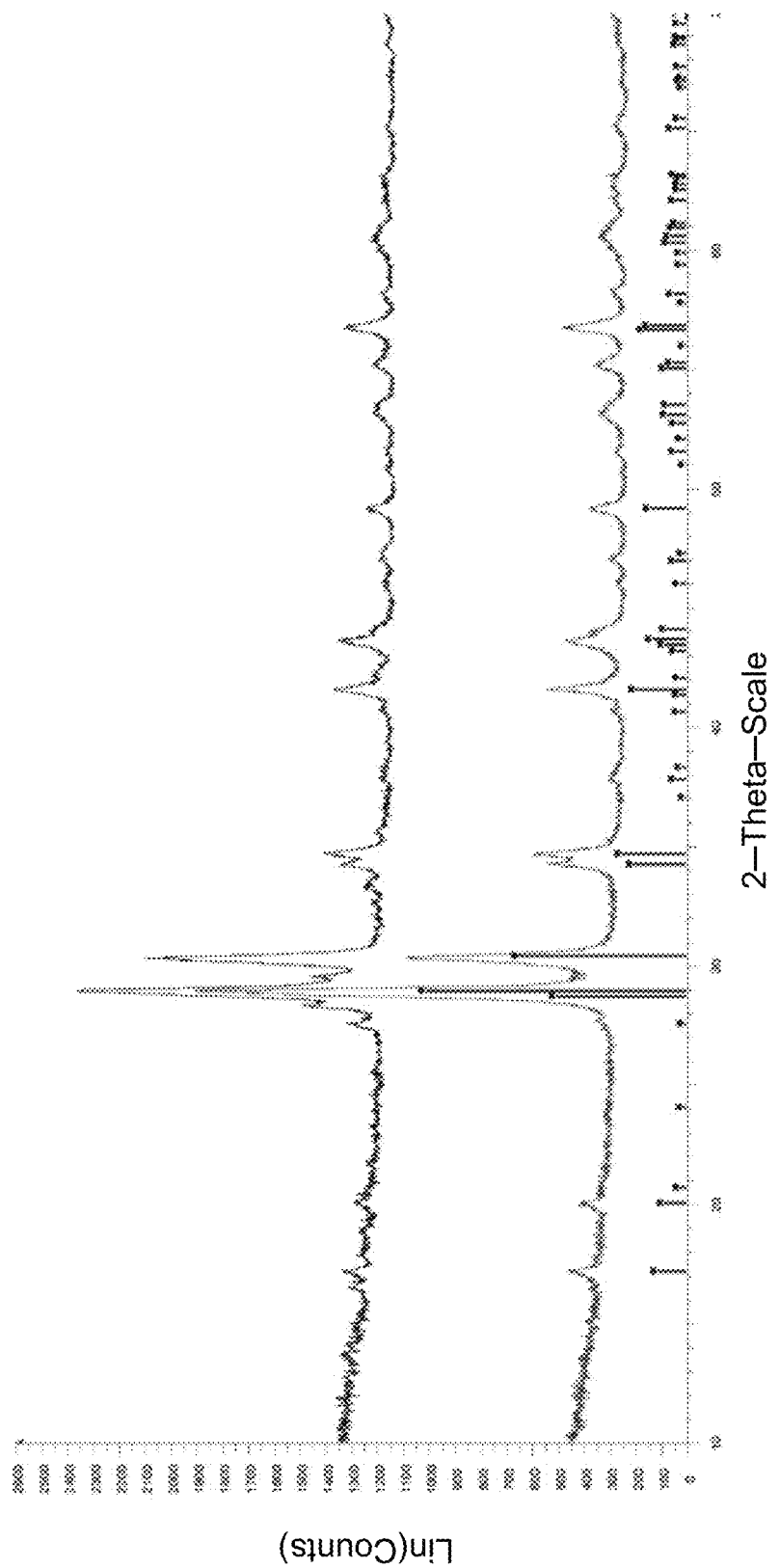
FIG. 4 schematically illustrates the X-ray diffraction analysis diagram of a precursor prepared by the preparation method of the battery composite material of the present invention.
Figure 5:
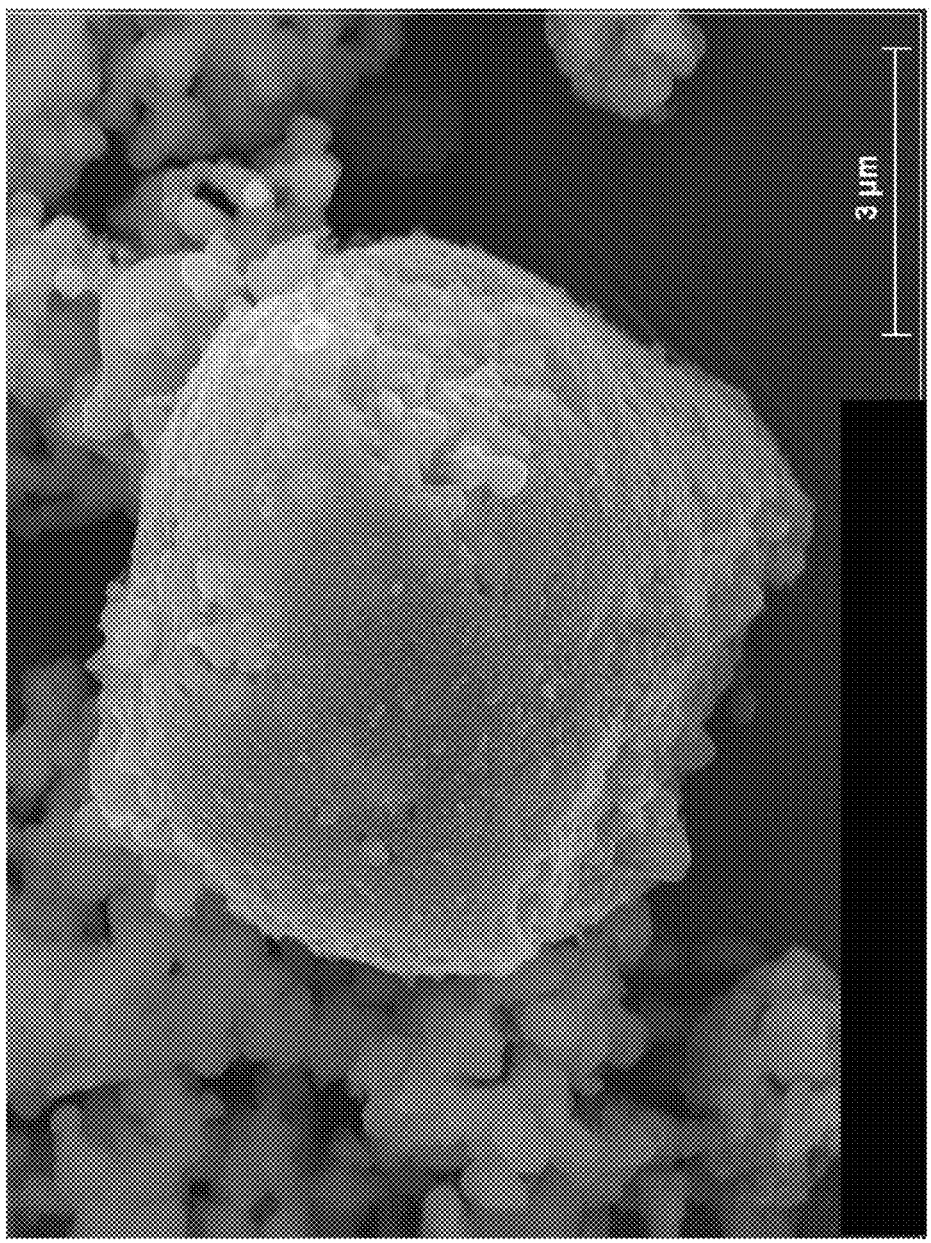
FIG. 5 schematically illustrates the SEM analysis diagram of a precursor prepared by the preparation method of the battery composite material of the present invention.

At first, providing 460 grams of manganese carbonate (Purity >99%), 462.7 grams of phosphoric acid (Purity >85%), 3.2 liters of deionized water and 147.76 grams of lithium carbonate and mixing manganese carbonate, phosphoric acid and the deionized water to process a reaction and stirring for 24 hours. Next, adding a dispersant and grinding the mixture (450-650 rpm) for 1 hour to obtain a $Mn_2P_2O_7$ precursor solution. Then, performing a spray drying action to the precursor solution, putting the product into a ceramic sagger, and performing a calcination to the product, among which the calcination is performed at a temperature greater than 380° C. for at least 2 hours in nitrogen atmosphere. The calcined compound is analyzed in manner of X-ray diffraction, and the analysis diagram is shown as FIG. 4. After comparing the diagram with JCPDS card, the compound is confirmed to be $Mn_2P_2O_7$. The surface exterior is analyzed through SEM, and the SEM analysis diagram is shown as FIG. 5.

Figure 6:
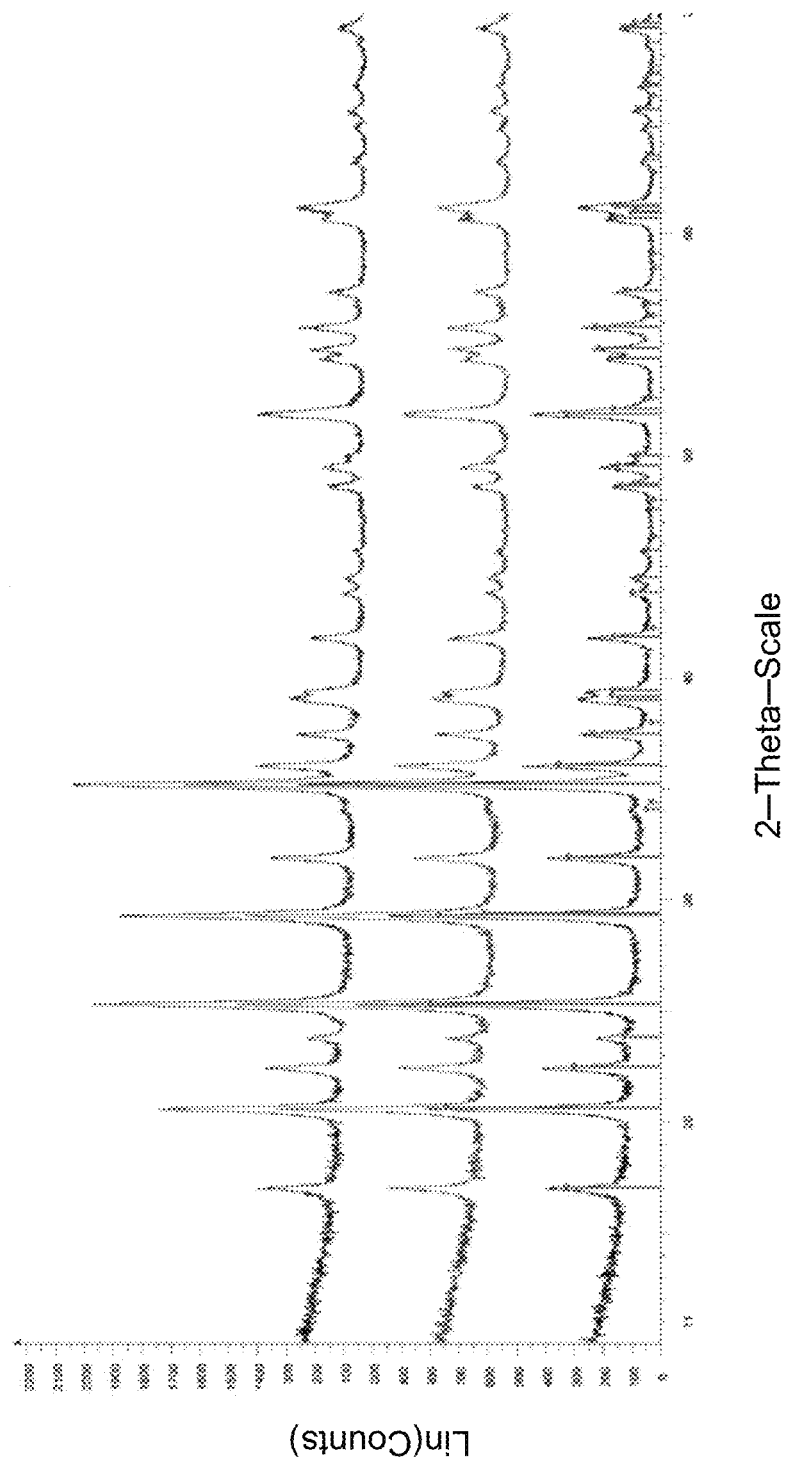
FIG. 6 schematically illustrates the X-ray diffraction analysis diagram of a battery composite material prepared by the preparation method of the battery composite material of the present invention.
Figure 7:
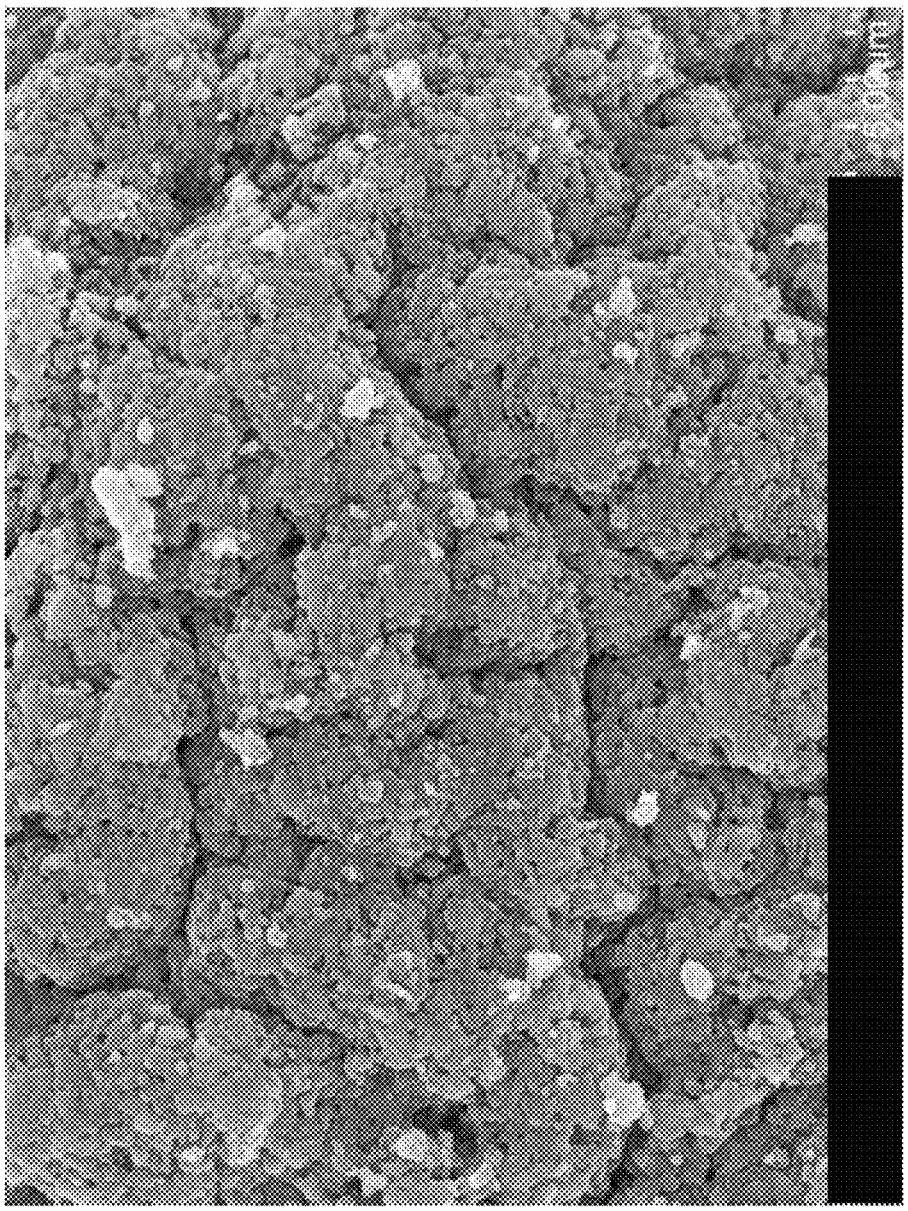
FIG. 7 schematically illustrates the SEM analysis diagram of a battery composite material prepared by the preparation method of the battery composite material of the present invention.

Next, adding 283.84 grams of $Mn_2P_2O_7$ obtained in the above-mentioned steps, 147.76 grams of lithium carbonate, 30 grams of fructose and 0.06 grams of TritonX-100® into pure water for grinding of the horizontal sander. After grinding, the $LiMnPO_4$ precursor solution is obtained. Then, performing a spray drying action to this precursor solution, putting the product into a ceramic sagger, and performing a calcination to the product, among which the calcination is performed at 550° C.-750° C. for 8-12 hours in nitrogen atmosphere. The calcined compound is analyzed in manner of X-ray diffraction, and the analysis diagram is shown as FIG. 6. After comparing the diagram with JCPDS card, the compound is confirmed to be $LiMnPO_4$. The surface exterior is analyzed through SEM, and the SEM analysis diagram is shown as FIG. 7.

Figure 8:
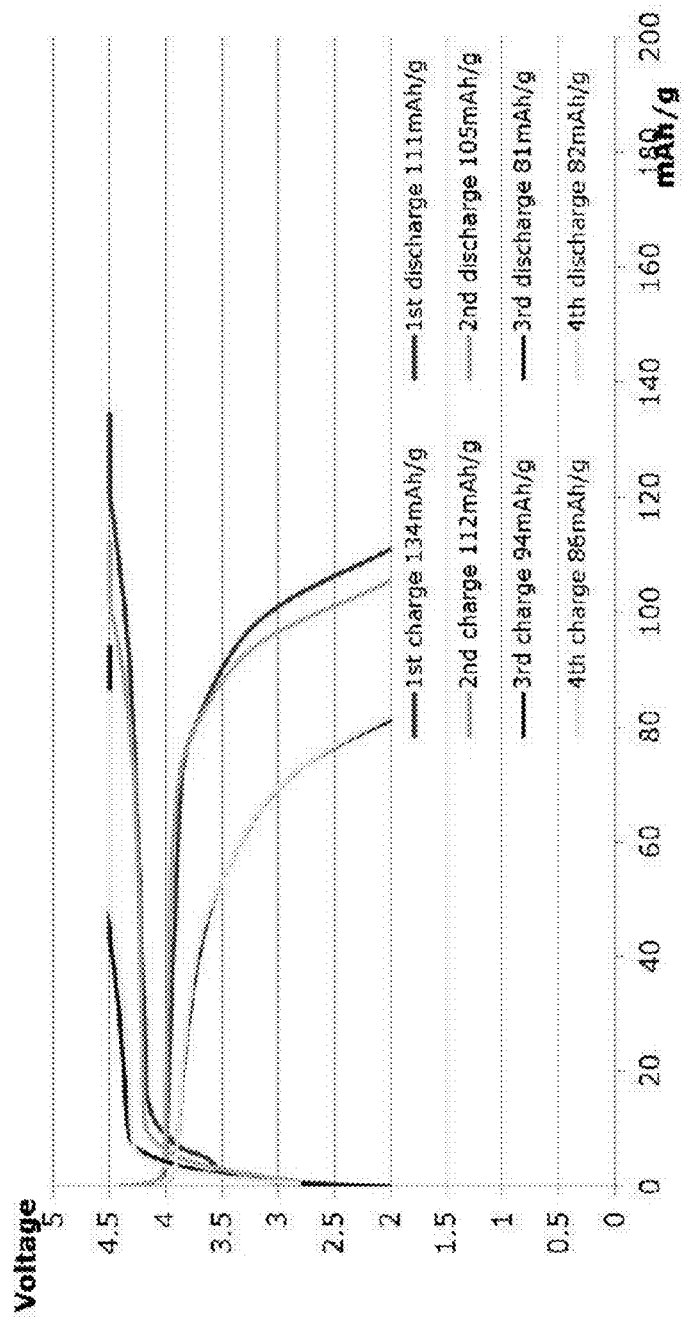
FIG. 8 schematically illustrates a charging and discharging characteristic diagram of a cell battery made of a battery composite material prepared by the preparation method of the battery composite material of the present invention.

Next, mixing $LiMnPO_4$ obtained in the above-mentioned steps, conductive carbon black (Super PC)) and 4 weight percent of binder (PVDF+NMP) in a ratio of 8:1:1. First, mixing 1 gram of conductive carbon black and 25 grams of binder (PVDF:NMP=40:960) for 10 minutes. The rotational speed is 1200 rpm. Then, adding 8 grams of $LiMnPO_4$ and mixing for another 10 minutes. Next, coating the dispersed slurry on an aluminum substrate with a blade coater, among which the coating thickness is 0.3 millimeters. Then, putting the coated aluminum substrate into an oven and baking the coated aluminum substrate at 100° C. for 1 hour. Finally, forming the aluminum substrate as a circular plate, among which the diameter of the circular plate is 1.3 centimeters, and making a coin-cell battery with this circular plate, lithium metal (as the negative electrode), 1 molar concentration of $LiPF_6$ and a mixed electrolyte of EC and DMC (volume ratio=1:1). The electric characteristics of charging and discharging of the coin-cell battery are tested and analyzed through a charging and discharging machine. The test and the analysis are performed at 0.1 coulombs for two cycles and 2 coulombs for two cycles. The charging and discharging characteristic diagram is shown as FIG. 8. The cutoff voltage of the coin-cell battery is 2 to 4.5 volts.

2nd Embodiment

Adding metal oxide, such as $V_2O_5$, $TiO_2$ or MgO, in the step S200 or the step S400 of the 1st embodiment, so that lithium manganese phosphate nano-co-crystalline olivine is produced. The rest portion of this embodiment is similar with the 1st embodiment, and is not redundantly described herein.

3rd Embodiment

Utilizing 12 weight percent of lactose as a carbon source in replace of the 30 grams of fructose of the 1st embodiment.

The rest portion of this embodiment is similar with the 1st embodiment, and is not redundantly described herein.

4th Embodiment

At first, providing 460 grams of manganese carbonate (Purity >99%), 462.7 grams of phosphoric acid (Purity >85%), 3.2 liters of deionized water, 147.76 grams of lithium carbonate and 74.7 grams of ferric phosphate dihydrate ($FePO_4 \cdot 2H_2O$) and mixing manganese carbonate, phosphoric acid and the deionized water to process a reaction and stirring for 24 hours. Next, adding a dispersant and grinding the mixture (450-650 rpm) for 1 hour to obtain a $Mn_2P_2O_7$ precursor solution. Then, performing a spray drying action to the precursor solution, putting the product into a ceramic sagger, and performing a calcination to the product, among which the calcination is performed at a temperature greater than 380° C. for at least 2 hours in nitrogen atmosphere. The calcined compound is confirmed to be $Mn_2P_2O_7$.

Figure 9:
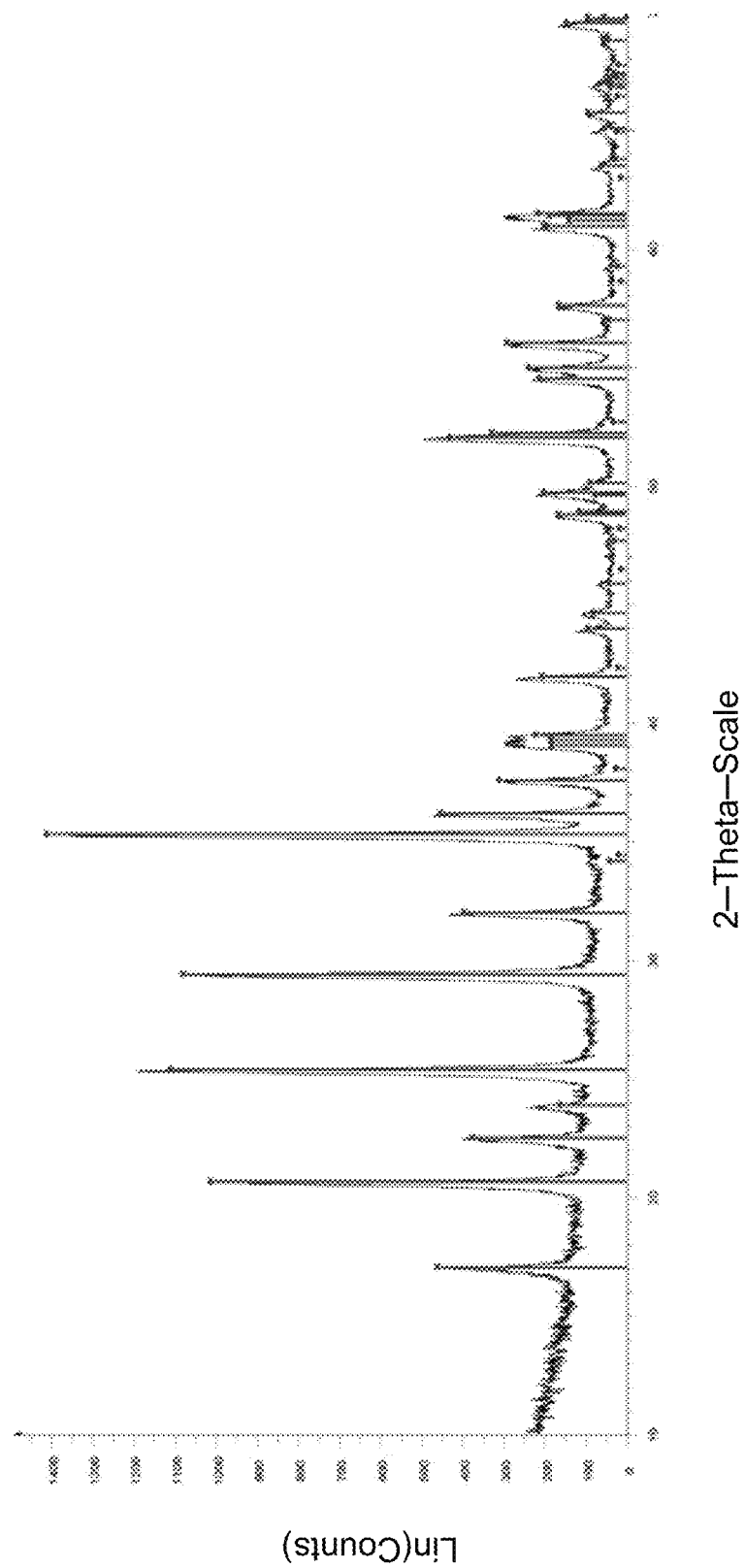
FIG. 9 schematically illustrates the X-ray diffraction analysis diagram of another battery composite material prepared by the preparation method of the battery composite material of the present invention.
Figure 10:
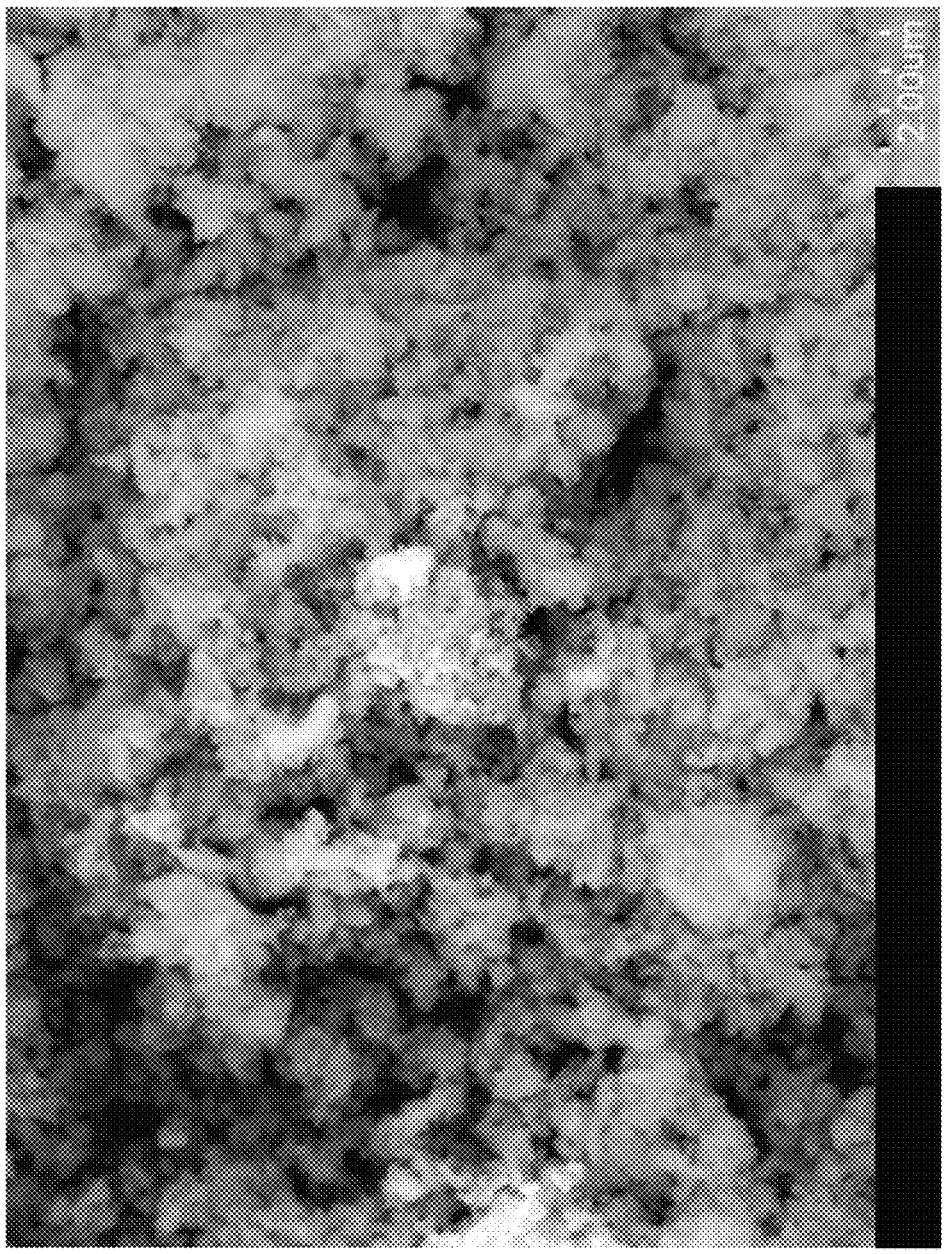
FIG. 10 schematically illustrates the SEM analysis diagram of another battery composite material prepared by the preparation method of the battery composite material of the present invention.

Next, adding 227.1 grams of $Mn_2P_2O_7$ obtained in the above-mentioned steps, 147.76 grams of lithium carbonate, 74.7 grams of $FePO_4 \cdot 2H_2O$, 30 grams of fructose and 0.06 grams of TritonX-100® into pure water for grinding of the horizontal sander. After grinding, the $LiMn_{0.8}Fe_{0.2}PO_4$ precursor solution is obtained. Then, performing a spray drying action to this precursor solution, putting the product into a ceramic sagger, and performing a calcination to the product, among which the calcination is performed at 550° C.-750° C. for 8-12 hours in nitrogen atmosphere. The calcined compound is analyzed in manner of X-ray diffraction, and the analysis diagram is shown as FIG. 9. After comparing the diagram with JCPDS card, the compound is confirmed to be $LiMn_{0.8}Fe_{0.2}PO_4$. The surface exterior is analyzed through SEM, and the SEM analysis diagram is shown as FIG. 10.

Figure 11:
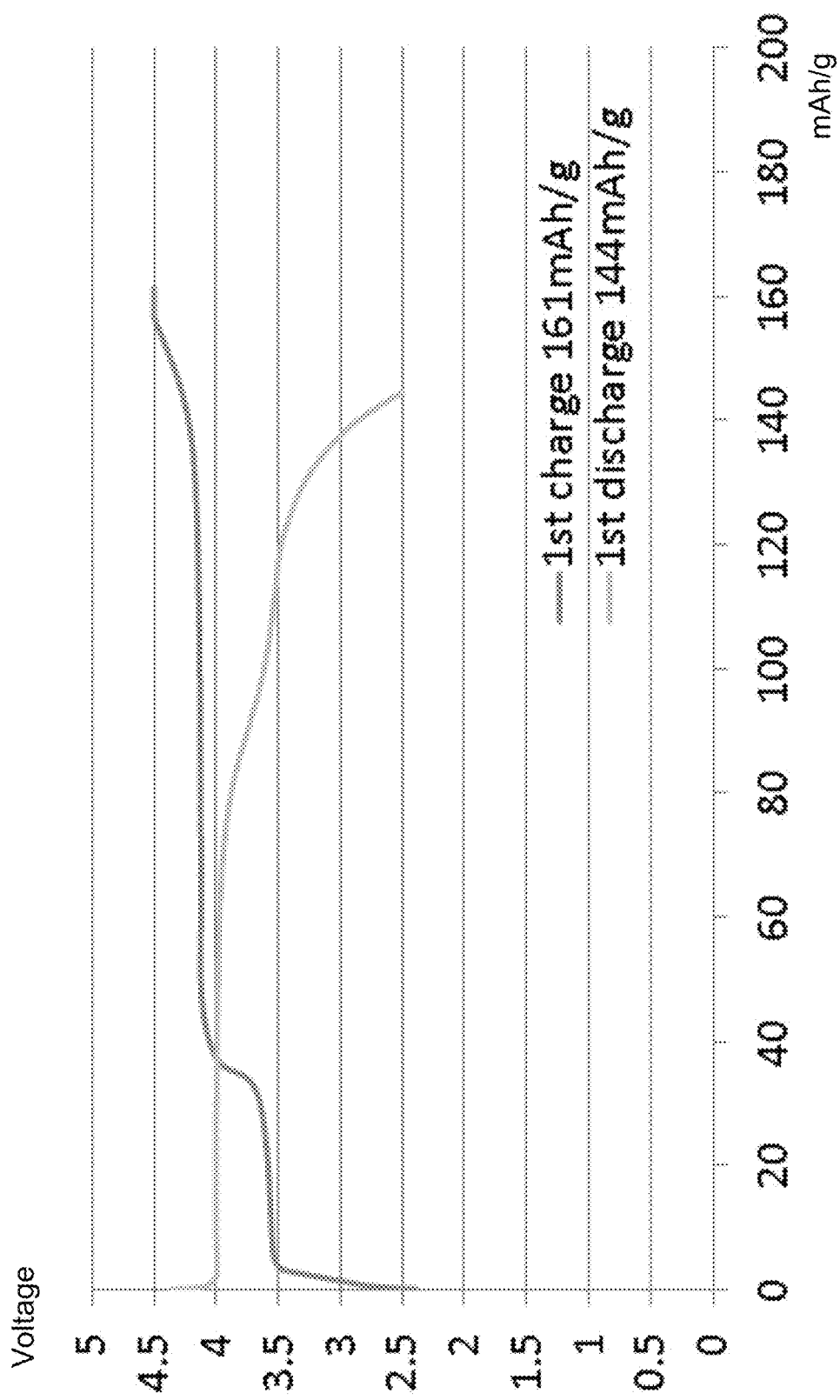
FIG. 11 schematically illustrates a charging and discharging characteristic diagram of a cell battery made of another battery composite material prepared by the preparation method of the battery composite material of the present invention.

Next, mixing $LiMn_{0.8}Fe_{0.2}PO_4$ obtained in the above-mentioned steps, conductive carbon black (Super PC)) and 4 weight percent of binder (PVDF+NMP) in a ratio of 8.5:0.5:1. First, mixing 0.5 grams of conductive carbon black and 25 grams of binder (PVDF:NMP=40:960) for 10 minutes. The rotational speed is 1200 rpm. Then, adding 8.5 grams of $LiMn_{0.8}Fe_{0.2}PO_4$ and mixing for another 10 minutes. Next, coating the dispersed slurry on an aluminum substrate with a blade coater, among which the coating thickness is 0.3 millimeters. Then, putting the coated aluminum substrate into an oven and baking the coated aluminum substrate at 100° C. for 1 hour. Finally, forming the aluminum substrate as a circular plate, among which the diameter of the circular plate is 1.3 centimeters, and making a coin-cell battery with this circular plate, lithium metal (as the negative electrode), 1 molar concentration of $LiPF_6$ and a mixed electrolyte of EC and DMC (volume ratio=3:7). The electric characteristics of charging and discharging of the coin-cell battery are tested and analyzed through a charging and discharging machine. The test and the analysis are performed at 0.1 coulombs for two cycles and 2 coulombs for two cycles. The charging and discharging characteristic diagram is shown as FIG. 11. The cutoff voltage of the coin-cell battery is 2.5 to 4.5 volts.

5th Embodiment

Adding metal oxide, such as $V_2O_5$, $TiO_2$ or MgO, in the step S200 or the step S400 of the 4th embodiment, so that lithium ferric manganese phosphate nano-co-crystalline olivine is produced. The rest portion of this embodiment is similar with the 4th embodiment, and is not redundantly described herein.

6th Embodiment

Utilizing 12 weight percent of lactose as a carbon source in replace of the 30 grams of fructose of the 4th embodiment. The rest portion of this embodiment is similar with the 4th embodiment, and is not redundantly described herein.

7th Embodiment

Adjusting the ratio of Mn to Fe of the 4th embodiment for achieving different features. In other words, the compound $LiMn_{0.8}Fe_{0.2}PO_4$ is adjusted as $LiMn_xFe_{1-x}PO_4$, among which x>0 and x is preferably 0.2-0.8. The rest portion of this embodiment is similar with the 4th embodiment, and is not redundantly described herein.

Figure 12A:
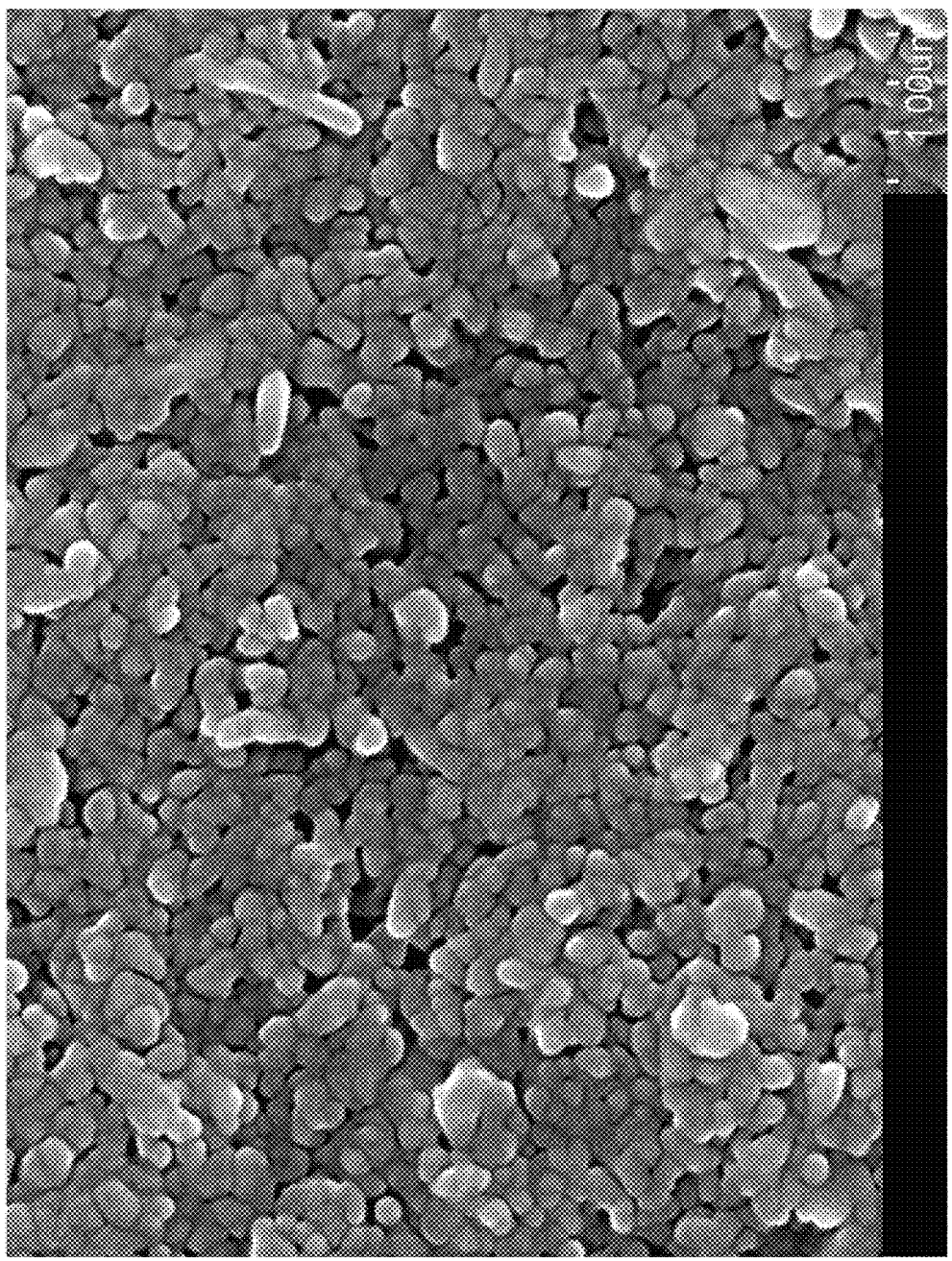
FIG. 12A, FIG. 12B and FIG. 12C schematically illustrate the SEM analysis diagram of a lithium manganese phosphate nano-co-crystalline olivine prepared by the preparation method of the battery composite material of the present invention.
Figure 12B:
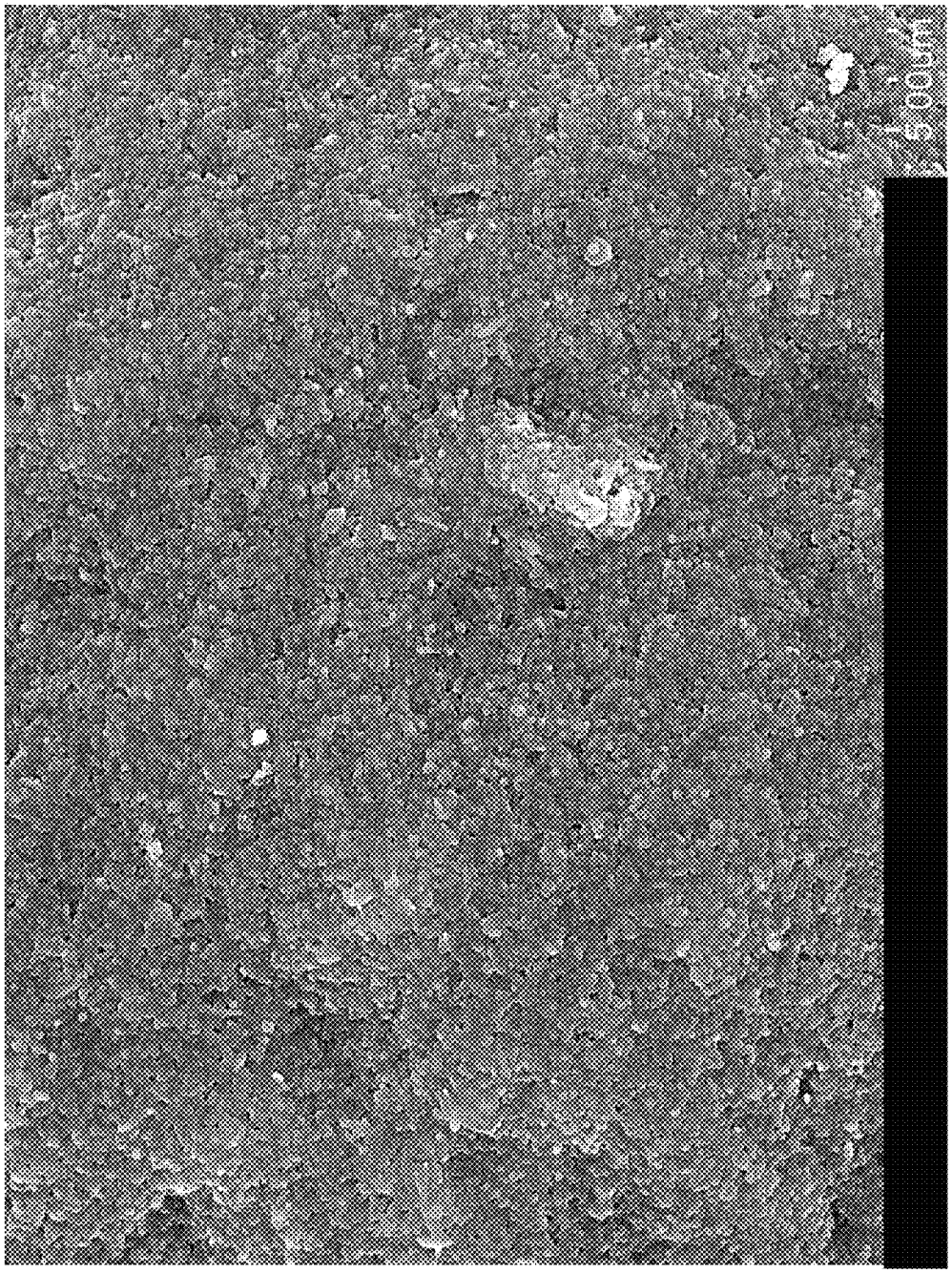
Figure 12C:
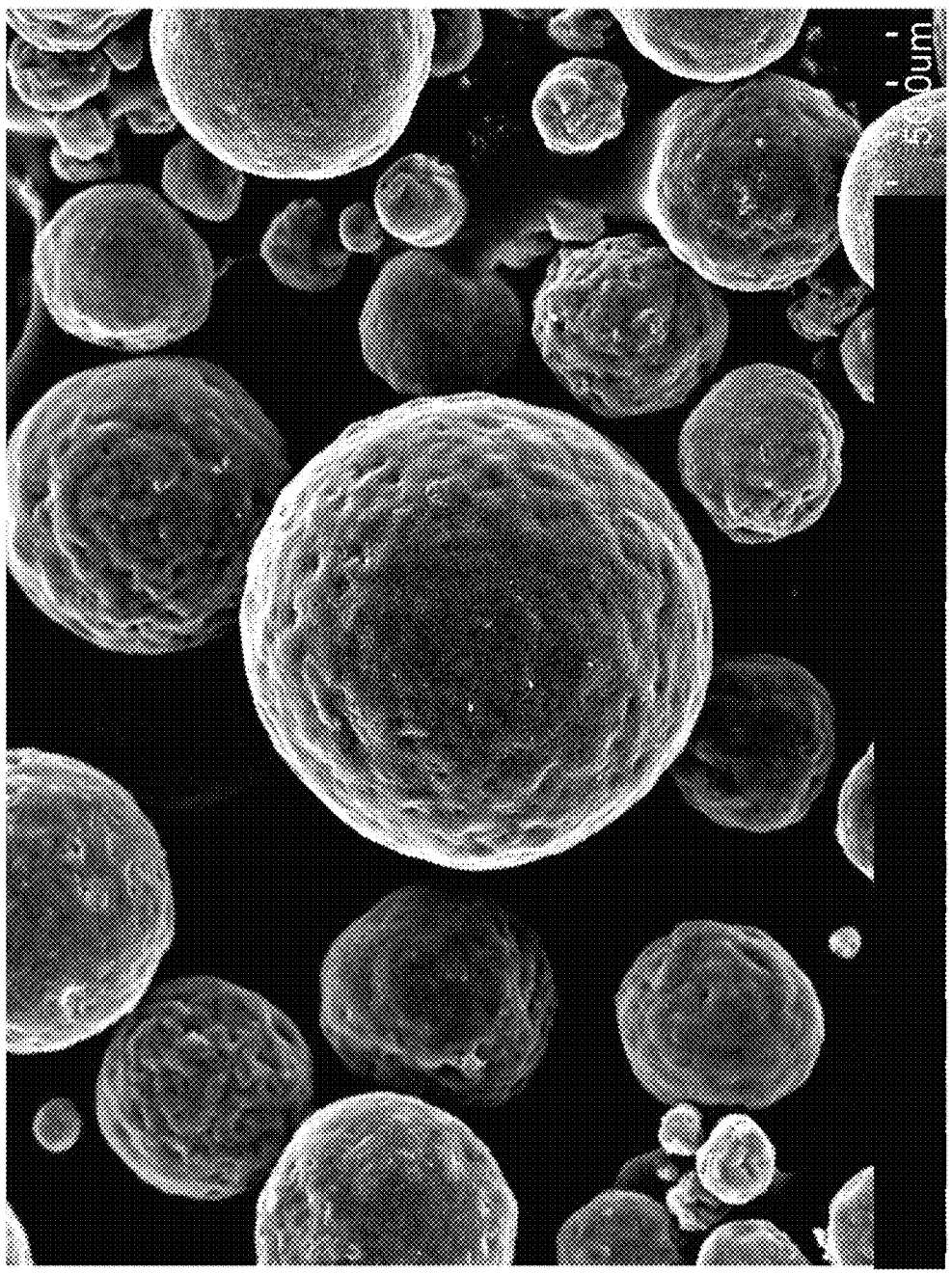

Please refer to FIG. 12A, FIG. 12B and FIG. 12C. FIG. 12A, FIG. 12B and FIG. 12C schematically illustrate the SEM analysis diagram of a lithium manganese phosphate nano-co-crystalline olivine prepared by the preparation method of the battery composite material of the present invention. The lithium manganese phosphate nano-co-crystalline olivine prepared by the preparation method of the battery composite material of the present invention is analyzed through SEM, and the SEM diagrams captured under magnifications of 50000×, 10000× and 1000× are respectively shown as FIG. 12A, FIG. 12B and FIG. 12C.

Figure 13A:
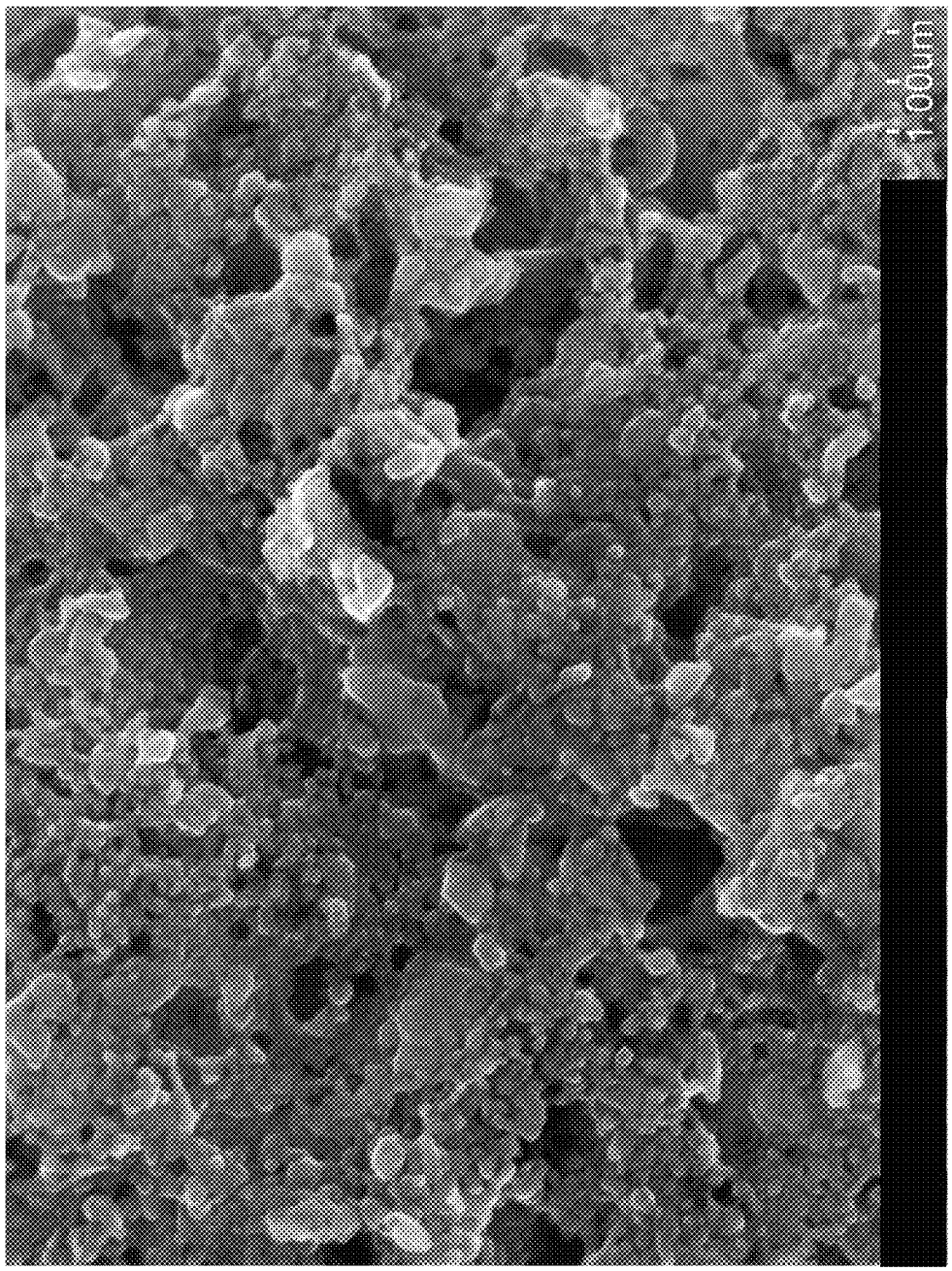
FIG. 13A, FIG. 13B and FIG. 13C schematically illustrate the SEM analysis diagram of a lithium ferric manganese phosphate nano-co-crystalline olivine prepared by the preparation method of the battery composite material of the present invention.
Figure 13B:
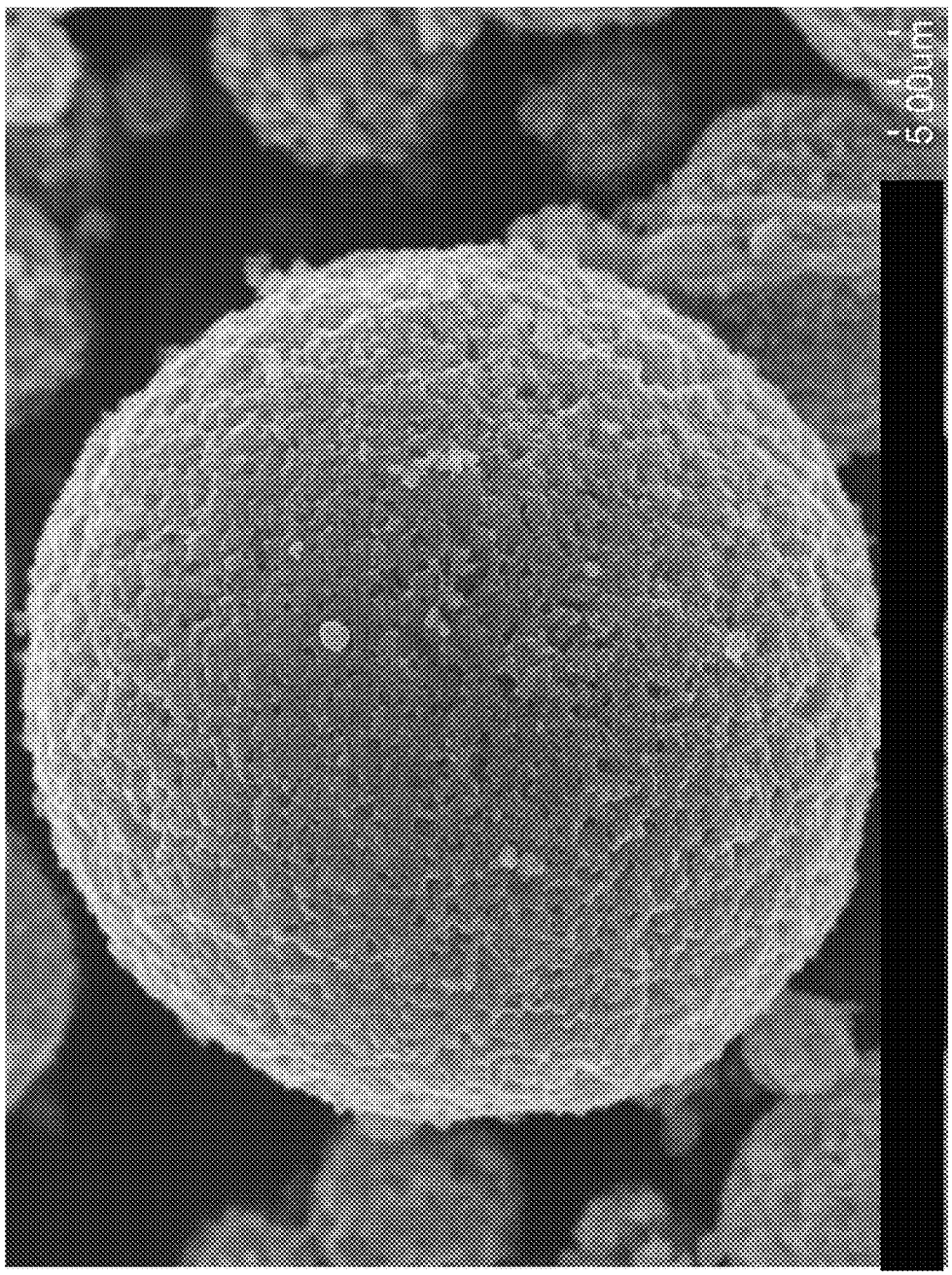
Figure 13C:
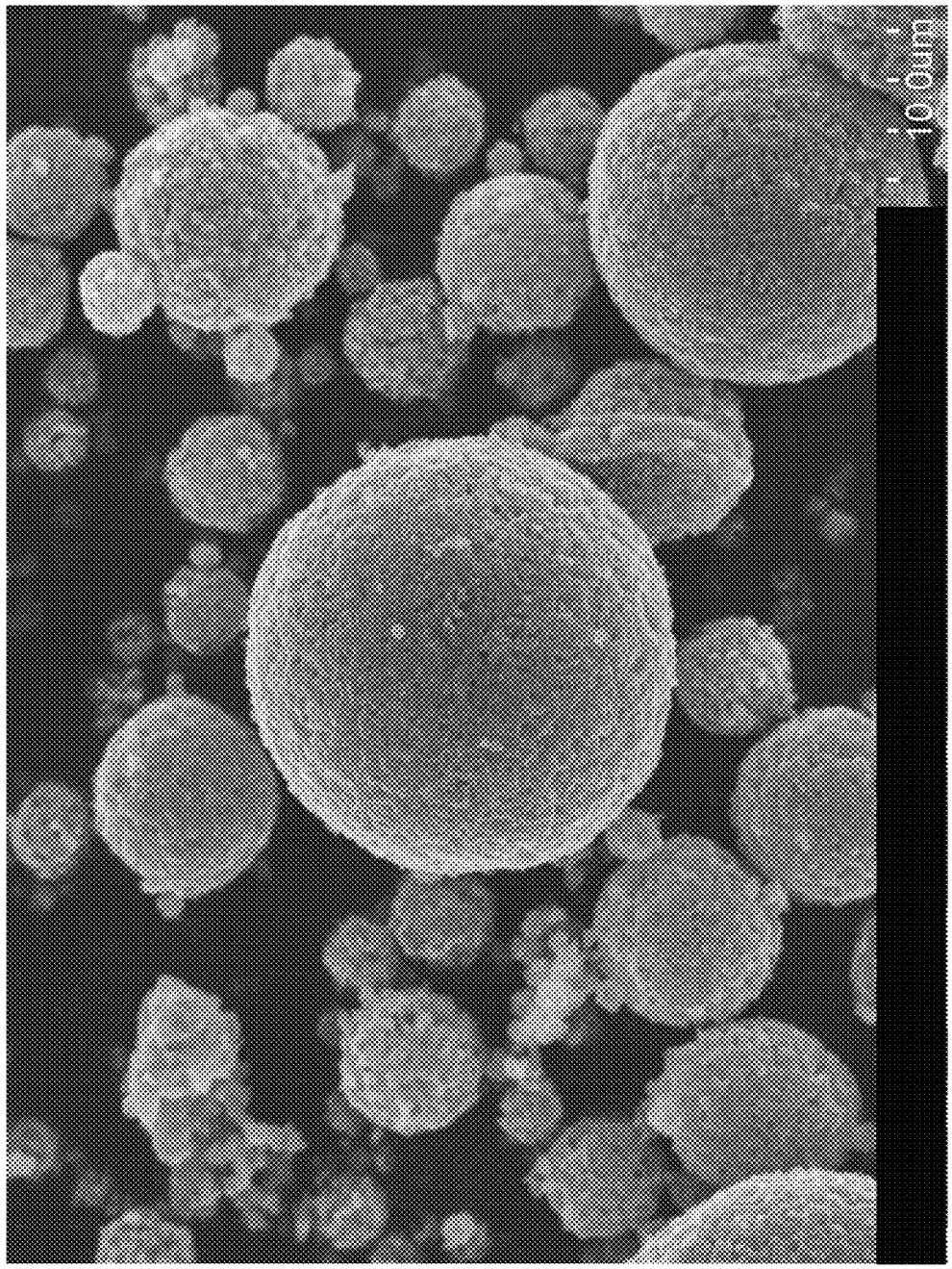

Please refer to FIG. 13A, FIG. 13B and FIG. 13C. FIG. 13A, FIG. 13B and FIG. 13C schematically illustrate the SEM analysis diagram of a lithium ferric manganese phosphate nano-co-crystalline olivine prepared by the preparation method of the battery composite material of the present invention. The lithium ferric manganese phosphate nano-co-crystalline olivine prepared by the preparation method of the battery composite material of the present invention is analyzed through SEM, and the SEM diagrams captured under magnifications of 50000×, 10000× and 1000× are respectively shown as FIG. 13A, FIG. 13B and FIG. 13C.

From the above description, the present invention provides a preparation method of a battery composite material and a precursor thereof for reducing the grinding time and the costs per unit of time and money in manner of preparing the battery composite material through the precursor produced via reactions. Meanwhile, the sensitivity of pH value of the process is reduced, the viscosity of the material and the blockage of processing pipes are avoided, the processing temperature is stably controlled, and the operation difficulty of the process is reduced. Furthermore, by utilizing lithium carbonate in replace of lithium hydroxide, the pH value of the process becomes more stable, such that the carbon-coating result and the product performance are both enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A preparation method of a battery composite material, comprising steps of:

(a) providing phosphoric acid, manganese carbonate, water and a first reactant, wherein the formula of the phosphoric acid is written by $H_3PO_4$, the first reactant is lithium carbonate, and the formula of the lithium carbonate is written by $Li_2CO_3$;
(b) processing a reaction of the phosphoric acid, the manganese carbonate and the water to produce a first product;
(c) calcining the first product to produce a precursor, wherein the formula of the precursor is written by $Mn_2P_2O_7$; and
(d) processing a reaction of the precursor and at least the first reactant to obtain a reaction mixture, and then calcining the reaction mixture to produce the battery composite material,
wherein the step (d) further comprises steps of:
  (d1) mixing the precursor and at least the first reactant;
  (d2) adding water or solvent for grinding and drying to remove the water or the solvent;
  (d3) performing a high-temperature calcination; and
  (d4) producing the battery composite material.

2. The preparation method according to claim 1, wherein the battery composite material is lithium manganese phosphate or lithium manganese phosphate nano-co-crystalline olivine, and the formula of lithium manganese phosphate is written by $LiMnPO_4$.

3. The preparation method according to claim 1, wherein the step (d) is implemented by processing a reaction of the precursor, the first reactant and a second reactant to obtain the reaction mixture and calcining the reaction mixture to produce the battery composite material.

4. The preparation method according to claim 3, wherein the second reactant is ferric phosphate dihydrate, the formula of the second reactant is written by $FePO_4 \cdot 2H_2O$, and wherein the battery composite material is lithium ferric manganese phosphate or lithium ferric manganese phosphate nano-co-crystalline olivine, and the formula of lithium ferric manganese phosphate is written by $LiMn_xFe_{1-x}PO_4$, $x>0$.

5. The preparation method according to claim 1, wherein the step (b) further comprises a step of (b1) allowing a first quantity of the water to dissolve a second quantity of the phosphoric acid and a third quantity of the manganese carbonate and stirring for a first time period for producing the first product.

6. The preparation method according to claim 5, wherein the weight ratio of the second quantity to the third quantity is 1:1.

7. The preparation method according to claim 5, wherein the first quantity is 3.2 liters, the second quantity is 462.7 grams, the third quantity is 460 grams, and the first time period is 24 hours.

8. The preparation method according to claim 1, wherein the step (c) further comprises steps of:
  (c1) adding a dispersant into the first product;
  (c2) grinding the first product at a first rotational speed for a second time period to obtain a precursor solution; and
  (c3) performing a spray drying action and a thermal treatment to the precursor solution.

9. The preparation method according to claim 8, wherein the first rotational speed is equal to or greater than 450 rpm and equal to or less than 650 rpm, and the second time period is 1 hour.

10. The preparation method according to claim 8, wherein the thermal treatment is performed at a temperature greater than 380° C. for at least 2 hours in nitrogen atmosphere.

11. The preparation method according to claim 8, wherein the dispersant is polyethylene glycol tert-octylphenyl ether.

12. The preparation method according to claim 1, wherein the high-temperature calcination is performed at a temperature between 550° C. and 750° C. for at least 8 to 12 hours in nitrogen atmosphere.

* * * * *